US012602830B2

(12) United States Patent
Baeumer et al.

(10) Patent No.: US 12,602,830 B2
(45) Date of Patent: Apr. 14, 2026

(54) METHOD FOR CALIBRATING CAMERAS OF A MULTICHANNEL MEDICAL VISUALIZATION SYSTEM AND MEDICAL VISUALIZATION SYSTEM

(71) Applicant: CARL ZEISS MEDITEC AG, Jena (DE)

(72) Inventors: Richard Baeumer, Oberkochen (DE); Marco Woerner, Oberkochen (DE); Henrike Von Huelsen, Oberkochen (DE)

(73) Assignee: CARL ZEISS MEDITEC AG, Jena (DE)

( * ) Notice: Subject to any disclaimer, the term of this patent is extended or adjusted under 35 U.S.C. 154(b) by 167 days.

(21) Appl. No.: 18/478,968

(22) Filed: Sep. 29, 2023

(65) Prior Publication Data

US 2024/0119632 A1 Apr. 11, 2024

(30) Foreign Application Priority Data

Oct. 7, 2022 (DE) ...................... 10 2022 210 623.7

(51) Int. Cl.
| | |
|---|---|
| *G06T 3/00* | (2024.01) |
| *G06T 3/40* | (2006.01) |
| *G06T 7/80* | (2017.01) |

(52) U.S. Cl.
CPC .................. *G06T 7/85* (2017.01); *G06T 3/40* (2013.01); *G06T 2207/10056* (2013.01)

(58) Field of Classification Search
None
See application file for complete search history.

(56) References Cited

U.S. PATENT DOCUMENTS

| | | | |
|---|---|---|---|
| 10,299,880 B2 * | 5/2019 | Ramirez Luna | ..... H04N 13/156 |
| 11,385,436 B2 | 7/2022 | Stegmann et al. | |

(Continued)

FOREIGN PATENT DOCUMENTS

| | | |
|---|---|---|
| DE | 10 2017 101 824 A1 | 8/2018 |
| DE | 10 2021 204 033 B3 | 6/2022 |

OTHER PUBLICATIONS

Litsch. "DE 102021204033 B3 Translation". Jun. 15, 2022. (Year: 2022).*

(Continued)

*Primary Examiner* — Zhihan Zhou
(74) *Attorney, Agent, or Firm* — Nixon Peabody LLP

(57) ABSTRACT

A method and a system for calibrating cameras of a multi-channel medical visualization system, including capturing a capturing region respectively imaged via channels of the multichannel medical visualization system by a respective camera, determining a magnification center for each of the channels, setting at least two magnification levels of a common mechanical magnification optical unit, identifying an image region which does not move or which moves the least across the magnification levels for each of the channels in image representations which are captured, and, proceeding from the respectively determined magnification centers, defining an image portion for each of the channels in the captured image representations with the respectively identified magnification center as the center, and restricting an output of the captured image representations at all magnification levels to the image portion defined for the respective channel.

15 Claims, 4 Drawing Sheets

(56)                    References Cited

U.S. PATENT DOCUMENTS

2018/0303574 A1 *   10/2018   Ramirez Luna ..... H04N 13/257
2019/0346659 A1 *   11/2019   Stegmann .............. G01B 11/02
2022/0343539 A1     10/2022   Litsch
2022/0350107 A1     11/2022   Stegmann et al.

OTHER PUBLICATIONS

German Office Action for Application No. 10 2022 210 623.7, mailed Oct. 31, 2022 (6 pages).

* cited by examiner

METHOD FOR CALIBRATING CAMERAS OF A MULTICHANNEL MEDICAL VISUALIZATION SYSTEM AND MEDICAL VISUALIZATION SYSTEM

CROSS-REFERENCE TO RELATED APPLICATIONS

The present application claims priority under 35 U.S.C. § 119 to German Patent Application No. 10 2022 210 623.7, filed Oct. 7, 2022, the contents of which are incorporated by reference herein in their entirety.

The invention relates to a method for calibrating cameras of a multichannel medical visualization system and to a medical visualization system.

The alignment of stereoscopic medical visualization systems includes the orientation of image representations of two optical channels (or optical paths) captured by cameras (camera images), relative to one another in the x-y-direction and in rotation. This can be implemented by way of a mechanical alignment (displacing and/or rotating the cameras) or digitally by way of image processing.

U.S. Pat. No. 10,299,880 B2 has disclosed a stereoscopic visualization camera and a visualization platform. An exemplary stereoscopic visualization camera comprises a first multiplicity of lens elements which are positioned along a first optical path, and a first image sensor for recording a first image stream of a target site using light in the first optical path. The stereoscopic visualization camera also comprises a second multiplicity of lens elements which are positioned along a second optical path parallel to the first optical path, and a second image sensor for recording a second image stream of the target site using light in the second optical path. The stereoscopic visualization camera also comprises a processor which is configured to reduce the bothersome parallax between the first and second image streams by virtue of pixel sets of pixel grids of the first and second image sensors being selected such that zoom repetition points are located in a centre of the respective grid of pixels.

The solution known from the prior art is in particular disadvantageous in that a parameter set must be determined and stored for each magnification level in order to be able to reduce the parallax over the entire working range of the magnification.

The invention is based on the object of improving a method for calibrating cameras of a medical visualization system and of improving a medical visualization system, with the result that in particular an outlay for calibrating the medical visualization system can be reduced.

According to the invention, the object is achieved by a method having the features of Patent claim 1 and a medical visualization system having the features of Patent claim 15. Advantageous configurations of the invention are evident from the dependent claims.

One of the fundamental concepts of the invention lies in calibrating a multichannel medical visualization system by way of determining magnification centres in each of the channels (the latter may also be referred to as optical paths). To this end, a capturing region respectively imaged via the channels, in particular via two channels, of the multichannel medical visualization system is captured by means of a respective camera. In the process, an image sensor of the camera provides an image representation which is restricted to a size of the image sensor in particular. A respective magnification centre is determined for each of the channels. Provision is made for at least two magnification levels of a common mechanical magnification optical unit to be set (mechanically) to this end and for an image region which does not move or which moves the least across the magnification levels to be identified for each of the channels in image representations which are captured at the at least two magnification levels by means of the respective camera. This image region forms the magnification centre (which may also be referred to as zoom centre) for the respective channel. In particular, the magnification centre can be determined and expressed as a two-dimensional picture element coordinate (e.g., in x-y-coordinates) in the respectively captured image representation. Then, a picture element coordinate for the respective magnification centre is known for each of the channels, in particular for each of the two channels. In particular, provision is made for more than two magnification levels to be set. Provision may also be made for a plurality of magnification levels to be passed through continuously, with at the same time a video stream made of successive image representations being captured for each of the channels; however, the procedure here is analogue as a matter of principle. In each case proceeding from the respectively determined magnification centres, an image portion for each of the channels is defined in the captured image representations with the respectively identified magnification centre as the centre. This is implemented for each of the channels, proceeding exclusively from the respectively identified magnification centre in particular. In particular, the respectively determined magnification centres are in each case defined independently of the determined magnification centres of the respective other channels. The image portion is specified in particular in the form of a parameter set of picture element coordinates, which uniquely describe the image portion with respect to the respective image representation. By way of example, such a set may comprise picture element coordinates of corners of a square or rectangular image portion of the captured image representation. Provision is made for an output of the captured image representations at all magnification levels to be restricted to the respectively defined image portions. Expressed differently, the captured image representations are cropped to the size of the respectively defined image portion and the respective image portion is provided as an output, for example as an analogue or digital image signal. As a result, it is possible to obtain an improved representation of multichannel image representations, especially stereoscopic image representations. In this case, the same defined image portions are used for all magnification levels, which is to say that each channel has one defined image portion which is used for all magnification levels. For a given channel, a parameter set describing the defined image portion is the same for all magnification levels.

In particular, a method for calibrating cameras of a multichannel medical visualization system is provided, wherein a capturing region respectively imaged via channels of the multichannel medical visualization system is captured by means of a respective camera, wherein a respective magnification centre is determined for each of the channels, wherein at least two magnification levels of a common mechanical magnification optical unit are set to this end and an image region which does not move or which moves the least across the magnification levels is identified for each of the channels in image representations which are captured at the at least two magnification levels by means of the respective camera, and wherein, proceeding from the respectively determined magnification centres, an image portion for each of the channels is defined in the captured image representations with the respectively identified magnification centre as the centre, and wherein an output of the captured image representations is restricted at all magnification levels to the image portion defined for the respective channel.

Further, a medical visualization system in particular is developed, the latter comprising a plurality of channels for capturing and imaging a capturing region, a camera for each of the plurality of channels, which is configured to capture the respective capturing region imaged by way of the channel, a common mechanical magnification optical unit, and a control device, wherein the control device is configured, for calibration purposes, to determine a respective magnification centre for each of the channels and, to this end, control the common mechanical magnification optical unit in such a way that at least two magnification levels are set, and to identify an image region which does not move or which moves the least across the magnification levels for each of the channels in image representations which are captured at the at least two magnification levels by means of the respective camera, and in each case proceeding from the respectively determined magnification centres, to define an image portion for each of the channels in the captured image representations with the respectively identified magnification centre as the centre, and to restrict an output of the captured image representations at all magnification levels to the image portion defined for the respective channel.

The method and the medical visualization system enable an uncomplicated and, in particular, automatable digital calibration of the plurality of channels of the medical visualization system. If the image representations are described with the aid of a two-dimensional coordinate system (e.g., in Cartesian x- and y-coordinates), then the method and the medical visualization system can bring about a relative displacement in the x- and y-direction. In particular, selecting the image portions and restricting the outputs to the image portions makes it possible to displace image contents depicted in the respective channels relative to one another in the two directions of the two-dimensional coordinate system. In particular, errors of a desired parallax can be reduced or rectified in full as a result thereof.

The method is particularly suitable for medical visualization systems in which there is an initial (mechanical) alignment of the cameras of the plurality of channels relative to one another, but for which a strict mechanical tolerance chain is subsequently provided, within the scope of which it is no longer possible to modify a position and an orientation (rotation) of the cameras without relatively large outlay. In this context, the method enables monitoring of the medical visualization system and allows misalignments that may occur in the field to be discovered, allows the extent thereof to be determined and allows these to be corrected for by way of digital image processing. Further, the attention of the user of the medical visualization system can be drawn to the misalignment. By way of example, identification and correction of the misalignment can be performed independently by hospital staff. In principle, the correction by way of digital image processing may also be complemented by an alignment; for example, image sensors of the cameras can be displaced laterally in relation to the sensor plane, which is to say perpendicular to the optical axis in particular. An imaging optical unit may additionally also be aligned. Following the alignment, the method should be carried out again such that remaining corrections can be performed by means of digital image processing.

An advantage of the method and of the medical visualization system is that an object used during the calibration need not be situated at the focus for the plurality of magnification levels since a magnification centre can be determined in any case, even outside of the focus. A further advantage is that, unlike in the aforementioned prior art, a parameter set describing the image portions need not be determined and stored for each of the magnification levels. By contrast, a single parameter set describing the image portions is sufficient and applies to all magnification levels of the common mechanical magnification optical unit. This can achieve a significant simplification and a reduction of the outlay during the calibration.

In particular, the magnification centre coincides with the image region which, in the captured image representations, moves least or does not move at all over the at least two magnification levels. In particular, this image region coincides with the channel's own optical axis in the common mechanical magnification optical unit. The optical elements of the common mechanical magnification optical unit are moved along the channel's own optical axis, in particular, when setting the at least two magnification levels. For this reason, there is an image region, especially a punctiform image region, which does not move or moves only very little. By way of example, this image region is identified by means of computer vision methods known per se (e.g., by determining the optical flow), by virtue of evaluating the plurality of captured image representations of the respective channel. It is advantageous that the determination of the magnification centre makes do without the recognition of specific features in the captured image representations as a matter of principle.

In particular, the image portion is defined by virtue of a picture element region being selected around the respective magnification centre in the captured image representation. In this case, the picture element region (in particular a size and/or shape thereof) may be fixedly given or flexibly adapted. By way of example, a number of picture elements in relation to a width and a height of the picture element region may be fixedly given. By way of example, the flexible adaptation may provide for a size of the picture element region to be chosen on the basis of a position of the identified magnification centre within the captured image representation. For example, if the identified magnification centre is located in the centre of the captured image representation, then the picture element region can be chosen to be larger than if the identified magnification centre is located further towards the edge of the captured image representation. Defining the size and/or shape of the image portions for the captured image representations of the plurality of channels may also be implemented in a manner coupled to one another. Then, an image portion is defined in a manner dependent on an image portion of at least one other channel, or the definition is implemented jointly for all channels. In particular, what this may achieve is that the smallest picture element region also specifies the picture element regions of the other channel or channels. What this may achieve is that the image portions provided as the output all have the same number of picture elements in relation to the width and height, which is to say they all have the same size.

In particular, restricting the captured image representations to the respectively defined image portion is implemented with the aid of image processing methods known per se. In particular, the captured image representations are cropped to the size of the respectively defined image portion and only the respective image portion is provided as an output. In relation to the number of picture elements, the defined image portion is in particular smaller, both in respect of the coordinate directions and in respect of an overall number of picture elements, than an image representation provided by an image sensor.

In particular, the medical visualization system is a medical microscope, more particularly a surgical microscope. In particular, the medical visualization system is an optical visualization system, meaning that it is based on an optical capture of the examination object, in particular an operating region. The medical visualization system is stereoscopic in particular. The medical visualization system serves in particular for a magnified representation of an operating region (site) during a surgical procedure. However, in principle, the medical visualization system may also serve for a magnified representation during diagnostic applications.

By way of example, a common mechanical magnification optical unit comprises different optical units and/or optical elements for the individual channels of the multichannel medical visualization system, which are coupled to one another electromechanically or the optical members of which are at least mechanically coupled to one another in part. In particular, provision is made for the channels (beam paths) to jointly share at least one main objective.

In particular, provision is made for the medical visualization system to be configured and/or aligned in such a way that the captured image representations are in focus when the determined magnification centres coincide with the same object point. Expressed differently, provision is made for the focal plane to be imaged when the determined magnification centres image the same object point. In particular, this ensures that the optical axes of the plurality of channels meet at a point in the focal plane. In particular, this alignment is carried out before the calibration is performed.

In particular, an alignment or aligning denotes an action carried out once and at the outset during an assembly of the medical visualization system, within the scope of which optical elements of the medical visualization system in particular are mechanically arranged in relation to one another in a target arrangement. In particular, a misalignment denotes a deviation from this target arrangement of the optical elements. Following the initial alignment, an alignment during the further operation of the medical visualization system denotes in particular a renewed mechanical arrangement of the optical elements, in particular, into the target arrangement.

In particular, a calibration denotes a determination of calibration data which describe a spatial relationship of optical elements and/or groups of optical elements with respect to one another. In particular, the calibration data may serve to carry out corrections, which within the scope of digital image processing are able to (at least partially) compensate a misalignment which has occurred. In the method described in this disclosure, the calibration comprises in particular the determination of the magnification centres and the definition of the respective image portions.

Provision can be made for a distortion correction to be carried out for each of the channels prior to the determination of the magnification centres and/or the definition of the respective image portions. In particular, this is implemented by means of methods known per se, for example by capturing a chequerboard pattern, on the basis of which the distortion can be determined in the captured image representations. Subsequently, a correction by way of digital image processing of the captured image representations can be implemented on the basis of the determined distortion.

Parts of the medical visualization system, in particular the control device, can be designed, either individually or together, as a combination of hardware and software, for example as program code that is executed on a microcontroller or microprocessor. However, provision can also be made for parts to be designed as application-specific integrated circuits (ASICs) and/or field-programmable gate arrays (FPGAs), either on their own or in combination.

In an embodiment, provision is made for dimensions of the image portions to be defined for all directions taking into consideration dimensions of the image representation provided by the respective image sensor of the cameras. This enables a flexible choice of the image portions. In particular, provision can be made for the image portions to be chosen as large as possible, which is to say at least up to a boundary specified by the image sensor.

In an embodiment, provision is made for the defined image portions to be chosen to have the same size. This can ensure that an identical image portion is provided for each of the plurality of channels, in particular for both of the two channels. Especially in the case of a stereoscopic representation, this enables an undisturbed perception by a user since the same object region can be displayed for each of the plurality of channels, especially for the two channels, and can be displayed by the user without impairments, in particular in largely congruent fashion. In particular, in the case of a restriction of the image portion by the dimensions of one of the image sensors, provision is made for the respective other image portion or portions to be restricted accordingly.

In an embodiment, provision is made for a relative twist (which may also be referred to as relative rotation) of the captured image representations of the channels to also be determined with respect to one another, wherein to this end at least one feature is identified in the captured image representations and a movement direction of a movement, implemented over the at least two magnification levels, of the at least one identified feature in the captured image representations is determined and evaluated, and wherein the determined relative twist is corrected at least for the defined image portions by adapting at least one of the image portions and/or by image processing. As a result, a relative twist of the captured image representations of the channels with respect to one another can also be corrected digitally. In particular, a movement direction of the at least one feature in relation to the identified magnification centre is determined in the process. For example, if a feature moves upwards relative to the magnification centre in the captured image representations of one of the channels and moves to the right in the captured image representations of another channel, then the captured image representations of the channels or the cameras are rotated with respect to one another through 90° in relation to the imaged image content or capturing region. A relative twist can also be determined in this way for values that are not as large and can subsequently be corrected by adapting at least one of the image portions and/or by image processing. By way of example, the adaptation may comprise a rotation of the image portion (i.e., an opposing rotation) which compensates the relative twist. In the process, provision can be made for the image portion to be newly defined, which is to say cropped again from the captured image representation in the twisted orientation. Alternatively, a content of the already defined and cropped image portion may merely be rotated in accordance with the relative twist without being cropped again from the captured image representation, with in that case regions going beyond the originally defined image portion being discarded and regions migrating into the originally defined image portion being filled, for example by picture elements coloured in black.

In an embodiment, provision is made for an absolute twist (which may also be referred to as absolute rotation) to also be determined for at least one channel on the basis of captured image representations, wherein to this end the at least one channel of the multichannel microscope is displaced by means of at least one actively movable axis of the visualization system, wherein at least one of the defined image portions is additionally or alternatively corrected by adapting the image portion and/or by image processing taking into consideration the determined absolute twist. As a result, the at least one image portion may also be oriented absolutely in relation to the at least one movable axis. In this case, the at least one movable axis is in particular a linear axis of the medical visualization system, which may for example be driven by means of an actuator system of the medical visualization system that is configured to this end. In particular, the at least one movable axis is a linear axis with a movement direction perpendicular to a (chief) beam path of the channels of the medical visualization system. Then, the image portion or portions can likewise be adapted in the manner already described hereinabove.

In an embodiment, provision is made for a reference calibration object to be used when determining the magnification centres and/or the twist(s). This may improve the determination since an object optimized to this end is used for the calibration. By way of example, the reference calibration object may comprise high-contrast features, for example a chequerboard pattern, a line pattern and/or the like, which can easily be detected and evaluated in the captured image representations.

In an embodiment, provision is made for the calibration to be performed automatically following a start-up and/or before a shutdown of the medical visualization system and/or at given time intervals and/or at given times and/or after a given number of operating cycles. As a result, the calibration can be performed repeatedly and automatically. This improves a calibration of the medical visualization system. In particular, a calibration error growth can be prevented if there is a repeated, more particularly regular calibration. By way of example, provision can be made for the calibration to be performed automatically after the medical visualization system has been switched on (started up). Then, the medical visualization system carries out the method at least once before it is ready for normal operation. Additionally or alternatively, the method can be performed at least once before the medical visualization system is switched off (shut down). The medical visualization system is only switched off and/or put into a standby state following the calibration. Further, provision can be made for one or more given time intervals, after which the medical visualization system should perform the method, to be stored in a memory of the control device. The method is carried out automatically after the defined time interval or intervals has or have elapsed. Further, provision can be made for given times, at which the calibration is intended to be carried out, to be stored in the memory of the control device. In this context, the times may be given both as regular dates (date and time, day of the week and time, etc.) and/or as operating hours (e.g., after 10, 20, 30, . . . operating hours, etc.). The given number of operating cycles may be stored in the memory of the control device. In this case, a single operating cycle encompasses, in particular, the start-up (switch-on or activation from the standby state) up to the completion of the shutdown. In any case, the control device verifies whether the respectively given condition or the respectively given conditions are satisfied and carries out the method should this be the case. In this context, provision can be made for the implementation of the calibration to be delayed and only be implemented after normal operation has been completed, in order not to impair the normal operation of the medical visualization system, which is to say its use in surgery or diagnostics.

In an embodiment, provision is made for the calibration to be carried out during the normal operation of the medical visualization system, if a magnification is changed and at least two magnification levels are set to this end. As a result, the calibration may also be performed during normal operation, with the result that continuous verification and correction of a displacement and/or (relative) twist is rendered possible.

In an embodiment, provision is made for the magnification centres and/or the twist(s) to be determined by means of an artificial intelligence method and/or by means of a determination of the optical flow. By way of example, a trained machine learning method, for example a trained neural network, can be used to this end. By way of example, the machine learning method is trained with the aid of training data. Each training data record comprises a plurality of image representations which were obtained at different magnification levels, in relation to which a magnification centre is known as ground truth, for example as an x-y-coordinate in a Cartesian coordinate system, in which the image representations (or the picture elements in the image representations) are able to be described. The machine learning method is trained on the basis of these training data. Subsequently, image representations captured at different magnification levels in an application phase may be supplied to the trained machine learning method as input data. The trained machine learning method then estimates the magnification centre (in the form of an x-y-coordinate) proceeding from these input data.

In an embodiment, provision is made for a maintenance request and/or alignment request to be generated and output if at least one of the defined image portions is adjacent to or goes beyond an edge of the image representation provided by the image sensor of the respective camera. In this way, maintenance and/or an alignment can be prompted if a displacement between the cameras of the plurality of channels is too large or is in danger of becoming too large. Further, a respective distance of an edge of the image portions from the edge of the respectively assigned captured image representation can be determined and evaluated and, for example, compared with a given threshold value, the undershooting of which prompts the generation and output of the maintenance request and/or alignment request. In this context, it is also possible to evaluate a trend of this distance over time and make the latter usable for a predictive maintenance request and/or alignment request.

In an embodiment, provision is made for at least three magnification levels to be set, wherein magnification centres are determined in each case by in each case taking account of at least two adjacent magnification levels of the at least three magnification levels, wherein a scatter of the determined magnification centres is evaluated. As a result, a quality criterion for the assessment of the quality of the magnification optical unit can be provided, in particular for each of the channels. An example for three magnification levels is given below for illustrative purposes: Image representations are captured at three magnification levels (1, 2 and 3). A first magnification centre (for each channel) can be determined in the captured image representations by combining magnification level 1 and magnification level 2, and a second magnification centre (for each channel) can be determined in the captured image representations by combining magnification level 2 and magnification level 3. Further combinations correspondingly arise if further magnification levels are set. In the process, more than only two (adjacent) magnification levels may also be taken into account when determining a magnification centre. In the ideal case, the determined magnification centres will always have the same coordinates (picture element coordinates). However, a potential deviation of the coordinates of the determined magnification centres can be used as a quality criterion for the magnification optical unit. Within the scope of the evaluation, the scatter of the determined magnification centres (or of the associated picture element coordinates) about a mean value may be compared with a given limit value in particular. If the given limit value is overshot, then this can be communicated to a user, for example in the form of a message and/or a signal (output for example by means of a signal transmitter and/or by means of a display device). A user can then undertake or prompt an alignment and/or calibration, and/or components can be replaced. Alternatively or additionally, the overshoot of the given limit value may also be stored in a memory of the control device of the medical microscope, with the result that this information can be recalled during subsequent maintenance and/or maintenance can be planned.

In an embodiment, provision is made for at least three magnification levels to be set, wherein magnification centres are determined in each case by in each case taking account of at least two adjacent magnification levels of the at least three magnification levels, wherein the image portions of the channels are defined in each case proceeding from a set magnification level and the magnification centres determined therefor in each case if different magnification centres are determined at different magnification levels and/or if a scatter of the determined magnification centres exceeds a given limit value. As a result, image portions can in each case be defined individually on the basis of the set magnification level if the magnification centres determined for the magnification levels deviate too significantly from one another (at least in certain portions), which is to say if the scatter of the position of the determined magnification centres (about a mean value) is too large. If a magnification level is subsequently set, then image portions which correspond to the set magnification level and which for example are stored in a memory of the control device of the medical visualization system are defined, and the output of the captured image representations is restricted accordingly. For example, to determine different magnification centres, a deviation of the position between two determined magnification centres can be determined and compared with a given limit value for such a deviation. If the given limit value for the deviation (or the scatter) is overshot, then the respective image portions are defined and set on an individual basis for each magnification level or for groups of magnification levels.

In an embodiment, provision is made for at least one same feature to be recognized in the image portions respectively defined for the channels, wherein a respective position of the at least one recognized same feature is determined in the respective image portions of the channels, wherein a deviation between the positions determined for the channels in each case is determined and evaluated. As a result, a quality criterion for the assessment of the quality of the magnification optical unit can be provided. If the determined deviation is too large, then this means that the magnification optical unit and/or a component are poorly aligned or the optical components have an insufficient quality. By way of example, provision can be made for the determined deviation to be compared with a threshold value given to this end. If the given limit value is overshot, then this can be communicated to a user, for example in the form of a message and/or a signal (output for example by means of a signal transmitter and/or by means of a display device). A user can then undertake or prompt an alignment, and/or components can be replaced. Provision can be made for the steps to be performed for individual magnification levels in each case. As a result, it is then possible to additionally verify whether a scaling (magnification) of both channels is of equal magnitude.

In an embodiment, provision is made for the medical visualization system to be in the form of a stereoscopic medical visualization system with at least two channels.

Further features relating to the configuration of the medical visualization system arise from the description of configurations of the method. The advantages of the medical visualization system here are in each case the same as for the configurations of the method.

The invention is explained in greater detail below on the basis of preferred exemplary embodiments with reference to the figures. In the figures:

FIG. 1 shows a schematic illustration of an embodiment of the medical visualization system;

FIGS. 2*a*, 2*b* show schematic illustrations for elucidating the method and the medical visualization device;

Figure 1:
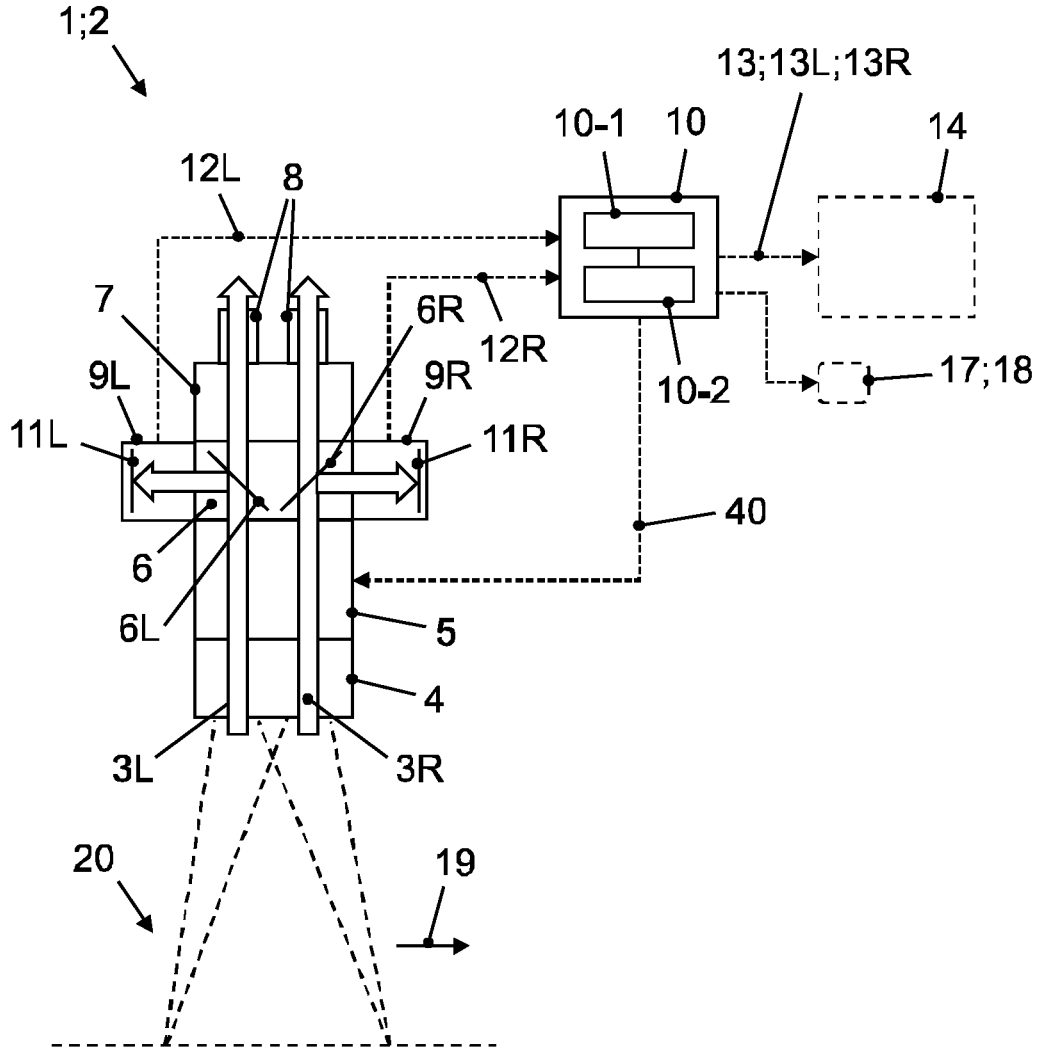

FIG. 1 shows a schematic illustration of an embodiment of the medical visualization system 1. In particular, the medical visualization system 1 is a stereoscopic medical visualization system 2, more particularly a stereoscopic surgical microscope. The medical visualization system 1 has two channels 3L, 3R (which may also be referred to as optical paths). The two channels 3L, 3R image a capturing region 20, in particular an operating region.

The medical visualization system 1 comprises an objective 4, a common mechanical magnification optical unit 5, a beam splitter unit 6, a binocular tube 7 and eyepieces 8. Further, the medical visualization system 1 comprises a camera 9L, 9R for each of the channels 3L, 3R, and also a control device 10. The illustration in FIG. 1 is much simplified and serves in particular to explain and elucidate the method described in this disclosure.

The beam splitter unit 6 comprises a beam splitter 6L, 6R for each of the channels 3L, 3R, said beam splitters steering the imaged image content or capturing region 20 both in the direction of the eyepieces 8 and in the direction of the cameras 9L, 9R. With the aid of image sensors 11L, 11R, the cameras 9L, 9R capture the capturing region 20, which was imaged via the objective 4, the common mechanical magnification optical unit 5 and the respective beam splitter 6L, 6R, and make the image representations 12L, 12R captured by the image sensors 11L, 11R available to the control device 10.

The control device 10 comprises a computing device 10-1 and a memory 10-2. For calibration purposes, the control device 10 is configured to determine a respective magnification centre 15L, 15R (FIGS. 2*a* and 2*b*) for each of the channels 3L, 3R. To this end, the control device 10 drives an actuator system of the common mechanical magnification optical unit 5 by means of a control signal 40, in such a way that at least two magnification levels are mechanically set (in succession). At the same time, image representations 12L, 12R are captured at the plurality of magnification levels and are supplied to the control device 10 for evaluation purposes.

In the image representations 12L, 12R captured by means of the respective camera 9L, 9R at the at least two magnification levels, the control device 10 identifies an image region for each of the channels 3L, 3R which does not move or which moves the least across the magnification levels. Proceeding from the determined magnification centres, the control device 10 chooses an image portion 13L, 13R for each of the channels 3L, 3R in the captured image representations 12L, 12R with the respectively identified magnification centre as centre (cf. FIGS. 2a and 2b).

In an output 13, the control device 10 then restricts the captured image representations 12L, 12R at all magnification levels to the image portion 13L, 13R defined for the respective channel 3L, 3R. To this end, the control device 10 crops the captured image representations 12L, 12R to the defined image portions 13L, 13R. Expressed differently, following the calibration, only the respectively defined image portion 13L, 13R of the captured image representations 12L, 12R is ever provided as output 13 at all magnification levels. In this case, the defined image portion 13L, 13R corresponds in particular to a portion of picture elements from the captured image representations 12L, 12R which, in relation to the encompassed picture elements of the captured image representations 12L, 12R, remains unchanged over all magnification levels (if a captured image representation has 1024×768 picture elements for example, then the image portion may be defined in a coordinate system defined thereby, for example by defining of the following two corners: (250, 250) and (850, 750); then, over all magnification levels, the image portion would span from the 250th picture element to the 850th picture element along the x-axis of the coordinate system and from the 250th picture element to the 750th picture element along the y-axis). Naturally, an image content comprised by the respective image portion 13L, 13R may change when the magnification levels are changed since a captured portion of the capturing region is changed.

The output 13, which is to say the cropped captured image representations 12L, 12R or image portions 13L, 13R, can be output, more particularly displayed, on a (stereoscopic) display device 14.

Figures 2A, 2B:
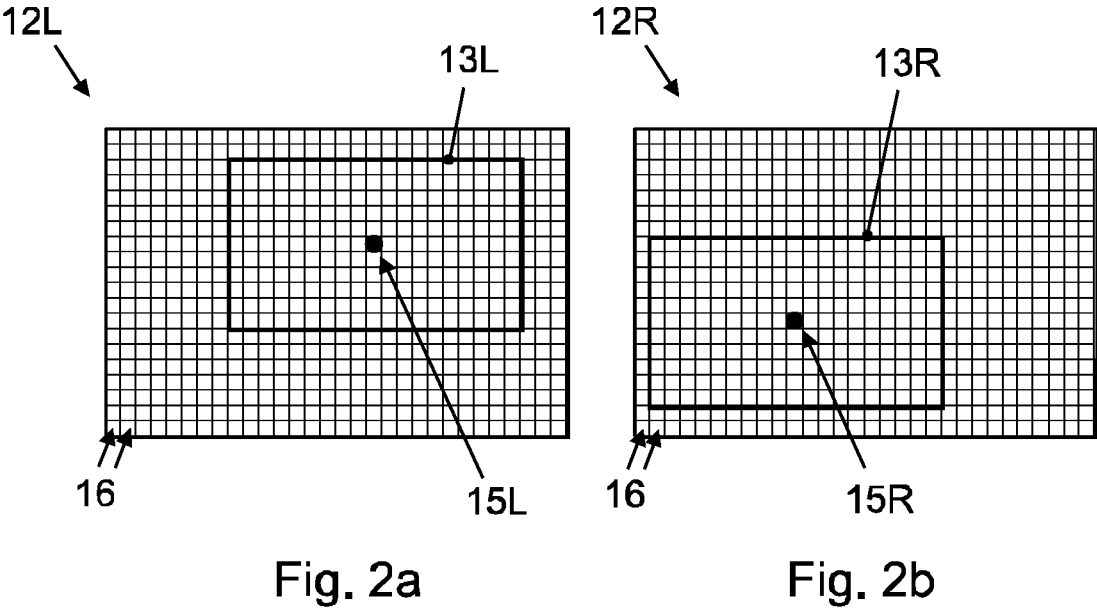

FIGS. 2a and 2b show schematic illustrations for elucidating the method and the medical visualization device. Schematic illustrations of the captured image representations 12L, 12R are shown. The image representations 12L, 12R correspond to the data provided by the image sensors 11L, 11R (FIG. 1) of the cameras 9L, 9R (FIG. 1). Individual picture elements 16 (only a few of which have been provided with a reference sign for reasons of clarity) of the captured image representations 12L, 12R are indicated schematically in FIGS. 2a and 2b. The identified magnification centres 15L, 15R are also shown in both image representations 12L, 12R. In this case, the magnification centres 15L, 15R correspond in particular to the image region which does not move or which moves the least over the at least two magnification levels. In this case, the magnification centres 15L, 15R are expressed in particular as a picture element coordinate in a coordinate system (e.g., with an x-axis and a y-axis) of the image representations 12L, 12R.

Proceeding from the respectively determined magnification centres 15L, 15R, an image portion 13L, 13R for each of the channels is defined in the captured image representations 12L, 12R with the respectively identified magnification centre 15L, 15R as the centre. For elucidation purposes, the case in which the cameras are not perfectly aligned is shown presently, with the result that the determined magnification centres 15L, 15R are not arranged in the centre of the overall captured image representations 12L, 12R.

For the output, the image representations 12L, 12R are restricted to the image portions 13L, 13R, which is to say the image representations 12L, 12R are cropped, in particular by image processing, in such a way that only the selected image portions 13L, 13R are provided as an output.

In the example shown, the dimensions of the two image portions 13L, 13R in relation to a number of picture elements 16 are chosen to be the same with regards to the width and height. However, in principle different dimensions of the image portions 13L, 13R are also possible. This is particularly advantageous if at least one of the image portions 13L, 13R is adjacent to the image sensor-effected boundaries of the respective image representation 12L, 12R. In this case, the affected image portion 13L, 13R may either reach only up to the image sensor-effected boundary or a part of the image portion 13L, 13R protruding beyond this boundary is filled with empty picture elements which are labelled accordingly, for example by filling with black picture elements.

In particular, provision can be made for dimensions of the image portions 13L, 13R to be defined for all directions taking into consideration dimensions of the image representation 12L, 12R provided by the respective image sensor 11L, 11R, of the cameras 9L, 9R. In particular, the image portions 13L, 13R then only reach up to the image sensor-effected boundary of the captured image representations 12L, 12R.

Provision can be made for a relative twist of the captured image representations 12L, 12R of the channels to also be determined with respect to one another, wherein to this end at least one feature is identified in the captured image representations 12L, 12R and a movement direction of a movement, implemented over the at least two magnification levels, of the at least one identified feature in the image representations 12L, 12R is determined and evaluated, wherein the determined twist is corrected at least for the defined image portions 13L, 13R by adapting at least one of the image portions 13L, 13R and/or by image processing. The control device 10 is accordingly configured to this end. By way of example, the adaptation may comprise a rotation in relation to the associated captured image representation 12L, 12R and about the magnification centre, which is to say the centre, of the at least one image portion 13L, 13R. This embodiment is elucidated in more detail on the basis of FIG. 4, which is explained hereinbelow.

Provision can be made for an absolute twist to be determined for at least one channel 3L, 3R on the basis of captured image representations 12L, 12R, wherein to this end the at least one channel 3L, 3R of the multichannel visualization system 1 is displaced by means of at least one actively movable axis 19 (FIG. 1) of the visualization system 1, wherein at least one of the defined image portions 13L, 13R is additionally or alternatively corrected by adapting the image portion 13L, 13R and/or by image processing taking into consideration the determined absolute twist. The control device 10 is accordingly configured to this end. In particular, the control device 10 accordingly drives an actuator system of the at least one actively movable axis 19.

Provision can be made for a reference calibration object to be used when determining the magnification centres 15L, 15R (FIGS. 2a and 2b) and/or the twist(s). By way of example, the latter may comprise high-contrast features which can easily be recognized when evaluating the captured image representations 12L, 12R. By way of example, such a reference calibration object may comprise known patterns, for example a chequerboard pattern, lines, wedges and/or other markers.

Provision can be made for the medical visualization system 1 to be aligned in such a way that the captured image representations 12L, 12R are in focus when the determined magnification centres 15L, 15R coincide with the same object point. Expressed differently, the determined magnification centres 15L, 15R image the same object point when an object is in focus. In particular, provision can be made for this method step, which is to say a corresponding alignment, to be performed before the other calibration method steps are performed.

Provision can be made for the calibration to be performed automatically following a start-up and/or before a shutdown of the medical visualization system 1 and/or at given time intervals and/or at given times and/or after a given number of operating cycles. In particular, the control device 10 is configured to store the given time intervals and/or given times and/or given number of operating cycles, for example in the memory 10-2, and to verify whether the condition respectively expressed thereby and/or the given operating state (start-up or shutdown) is satisfied. If the respective condition is satisfied, then the control device 10 starts the calibration.

Provision can be made for the calibration to be carried out during the normal operation of the medical visualization system 1, if a magnification is changed and at least two magnification levels are set to this end. The control device 10 is configured to recognize the change in the magnification and, for the calibration, evaluate in the manner as already described hereinabove the image representations 12L, 12R, captured during this change at the at least two magnification levels.

Provision can be made for the magnification centres 15L, 15R (FIGS. 2a and 2b) and/or the twist(s) to be determined by means of an artificial intelligence method and/or by means of determination of the optical flow. The control device 10 is accordingly configured to provide and apply the artificial intelligence method, for example a trained machine learning method, for example a trained neural network, and/or a method for determining the optical flow.

Provision can be made for a maintenance request 17 (FIG. 1) and/or alignment request 18 (FIG. 1) to be generated and output if at least one of the defined image portions 13L, 13R is adjacent to or goes beyond an edge of the image representation 12L, 12R provided by the image sensor 11L, 11R of the respective camera 9L, 9R. The control device 10 is configured to verify whether at least one of the defined image portions 13L, 13R is adjacent to or goes beyond an edge of the image representation 12L, 12R provided by the image sensor 11L, 11R of the respective camera 9L, 9R and, should this case be present, generate and output the maintenance request 17 and/or the alignment request 18. The request 17, 18 may also be output on the display device 14.

Provision can be made for at least three magnification levels to be set, wherein magnification centres 15, 15L, 15R are determined in each case by in each case taking account of at least two adjacent magnification levels of the at least three magnification levels, wherein a scatter of the determined magnification centres 15, 15L, 15R (about a mean value) is evaluated. By way of example, provision can be made for the control device 10 to determine the scatter and compare the latter with a given limit value. If the given limit value is overshot, then this is communicated to for example a user, for example in the form of a message and/or a signal (output for example by means of a signal transmitter and/or by means of the display device 14).

Provision can be made for at least three magnification levels to be set, wherein magnification centres 15, 15L, 15R are determined in each case by in each case taking account of at least two adjacent magnification levels of the at least three magnification levels, wherein the image portions 13, 13L, 13R of the channels 3L, 3R are defined in each case proceeding from a set magnification level and the magnification centres 15, 15L, 15R determined therefor in each case if different magnification centres 15, 15L, 15R are determined at different magnification levels and/or if a scatter of the determined magnification centres 15, 15L, 15R exceeds a given limit value. When setting a magnification level, the control device 10 then chooses the image portions 13, 13L, 13R defined therefor in each case.

Provision can be made for at least one same feature to be recognized in the image portions 13, 13L, 13R respectively defined for the channels 3L, 3R, wherein a respective position of the at least one recognized same feature is determined in the respective image portions 13, 13L, 13R of the channels 3R, 3L, wherein a deviation between the positions determined for the channels 3R, 3L in each case is determined and evaluated. In particular, the control device 10 can identify the at least one same feature in the respectively defined image portions 13, 13L, 13R, for example by means of computer vision and/or artificial intelligence and/or machine learning methods known per se. Further, the control device 10 can determine its respective position (as picture element coordinates in the image portions) and a deviation (difference in the picture element coordinates) of the positions respectively determined for the channels. Within the scope of the evaluation, the control device 10 compares this deviation with a given limit value and outputs a signal and/or notification (e.g., by means of a signal transmitter or by means of the display device 14) on the basis of a comparison result.

Figure 3:
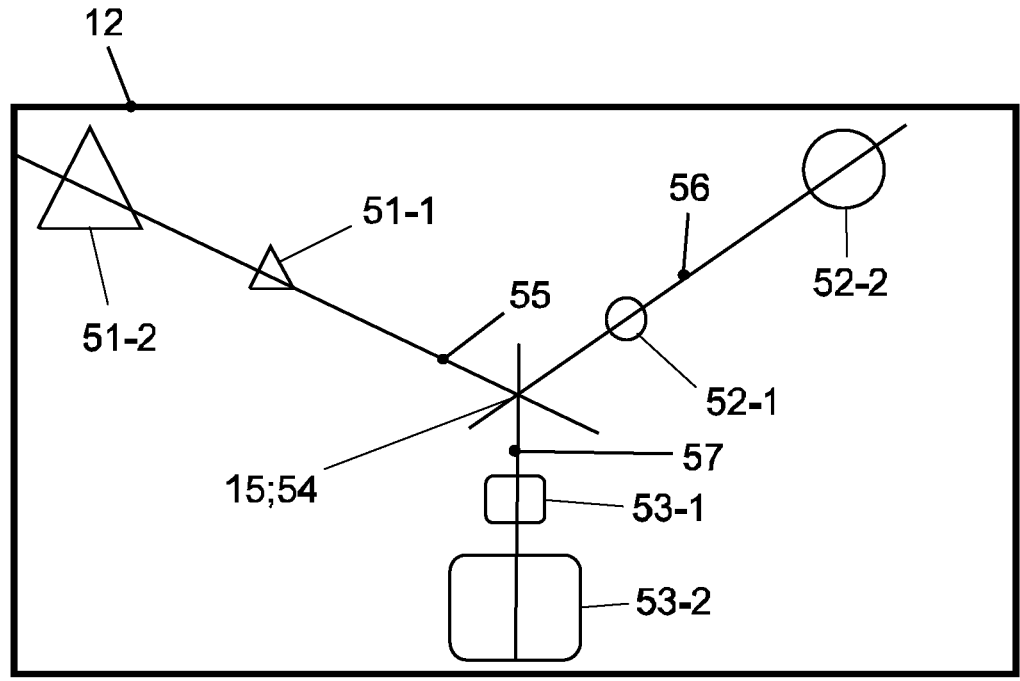
FIG. 3 shows a schematic illustration for elucidating an embodiment of the method and medical visualization system.

FIG. 3 shows a schematic illustration for elucidating an embodiment of the method and medical visualization system. In this embodiment, provision is made for same features 51-x, 52-x, 53-x to be identified in the image representations 12 captured for different magnification levels and be assigned to one another in each case in order to determine the magnification centre 15, wherein the zoom centre 15 is determined on the basis of an intersection 54 of straight lines 55, 56, 57 which arise by connecting the respective features 51-x, 52-x, 53-x corresponding to one another in the superimposed captured image representations 12. Two image representations 12 at different magnification levels are superimposed in FIG. 3. When the magnification is increased, the features 51-x, 52-x, 53-x migrate from the inside to the outside in the image representations 12 along the straight lines 55, 56, 57. The straight lines 55, 56, 57, the intersection 54 of which yields the magnification centre 15, arise by connecting the features 51-x, 52-x, 53-x which correspond to one another in each case. The magnification centre 15 does not move as a result of changing the magnification at the various magnification levels. Computer vision and/or machine learning methods can be used when recognizing and/or determining a position of the features 51-x, 52-x, 53-x.

Figure 4:
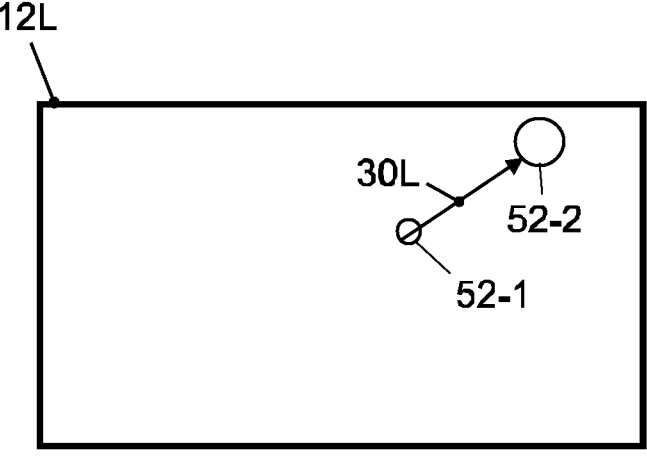
FIG. 4 shows a schematic illustration for elucidating a further embodiment of the method and medical visualization system.
Figure 4:
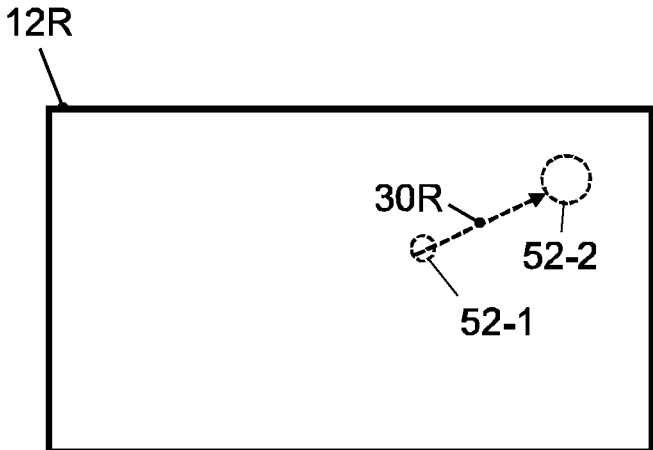
Figure 4:
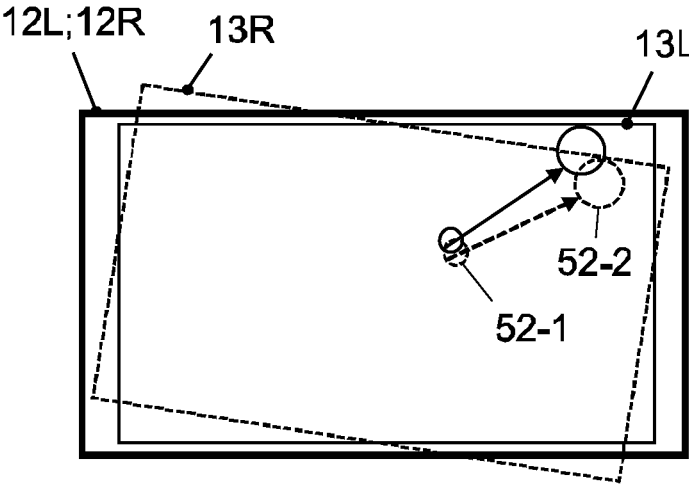

FIG. 4 shows a schematic illustration for elucidating a further embodiment of the method and medical visualization system. In this embodiment, provision is made for a relative twist of the captured image representations 12L, 12R of the channels to also be determined with respect to one another, wherein to this end at least one feature 52-$x$ is identified in the captured image representations 12L, 12R and a movement direction 30L, 30R of a movement, implemented over the at least two magnification levels, of the at least one identified feature 52-$x$ in the image representations 12L, 12R is determined and evaluated, wherein the determined twist is corrected at least for the defined image portions 13L, 13R by adapting at least one of the image portions 13L, 13R and/or by image processing. The control device 10 (FIG. 1) is accordingly configured to this end. By way of example, the adaptation may comprise a rotation in relation to the associated captured image representation 12L, 12R and about the magnification centre, which is to say the centre, of the at least one image portion 13L, 13R (cf. FIG. 4 hereinbelow). FIG. 4, top, shows the left image representation 12L and FIG. 4, centre, shows the right image representation 12R. The same feature 52-$x$ was identified at two magnification levels in the two image representations 12L, 12R (52-1 and 52-2, wherein the image representations 12L, 12R captured at the two magnification levels are respectively displayed above one another for elucidation purposes). The movement direction 30L, 30R of the recognized feature 52-$x$ is determined and evaluated for both image representations 12L, 12R. The relative twist between the captured image representations 12L, 12R of the channels with respect to one another can be determined on the basis of a deviation between the two determined movement directions 30L, 30R. The relative twist determined in this manner can be corrected, at least for the defined image portions 13L, 13R, by adapting at least one of the image portions 13L, 13R and/or by image processing. This is illustrated schematically in FIG. 4, bottom. In this case, the image portion 13R of the image representation 12R was rotated in relation to the image representation 12R such that the movement direction 30R in the image portion 13R coincides with the movement direction 30L in the image portion 30L. As a result, the relative twist which was present in the captured image representations 12L, 12R has been corrected in the image portions 30L, 30R. Stereoscopic perception of the image portions 30L, 30R is improved as a result of the correction.

Figure 5:
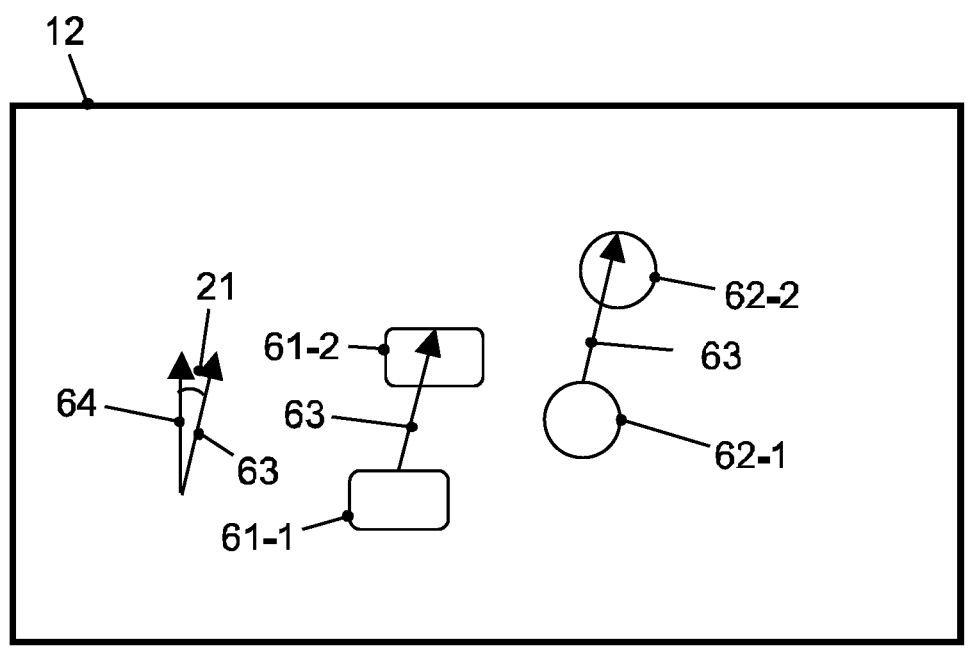
FIG. 5 shows a schematic illustration for elucidating a further embodiment of the method and medical visualization system.

FIG. 5 shows a schematic illustration for elucidating a further embodiment of the method and medical visualization system. This embodiment provides for same features 61-$x$, 62-$x$ to be recognized in the captured image representations 12 and be assigned to one another in each case in order to determine the absolute twist 21, in particular in the form of a rotation angle, wherein a displacement direction 63 of the same features 61-$x$, 62-$x$ is determined in relation to the superimposed captured image representations 12 using the same features 61-$x$, 62-$x$ as a starting point and wherein the twist 21 is determined using the determined displacement direction 63 as a starting point. FIG. 5 shows two superimposed image representations 12, which were captured for different axis positions of a linear actively movable axis 19 (FIG. 1) of the medical visualization system. Since the linear actively movable axis 19 does not run along a coordinate axis 64 of the picture elements of the image sensor of the camera defined for example as the target orientation and/or target direction in this example, the image representations 12 are rotated vis-à-vis the linear movement axis, and this can be determined as an (absolute) twist 21, in particular in the form of a rotation angle, from the captured image representations 12. To this end, the displacement direction 63 is determined in each case by virtue of the same features 61-$x$, 62-$x$ being interconnected in each case. A difference between a coordinate axis 64 of the image sensor and the displacement direction 63 yields the absolute twist 21 (in particular in the form of a rotation angle), and this can subsequently be corrected.

Figure 6:
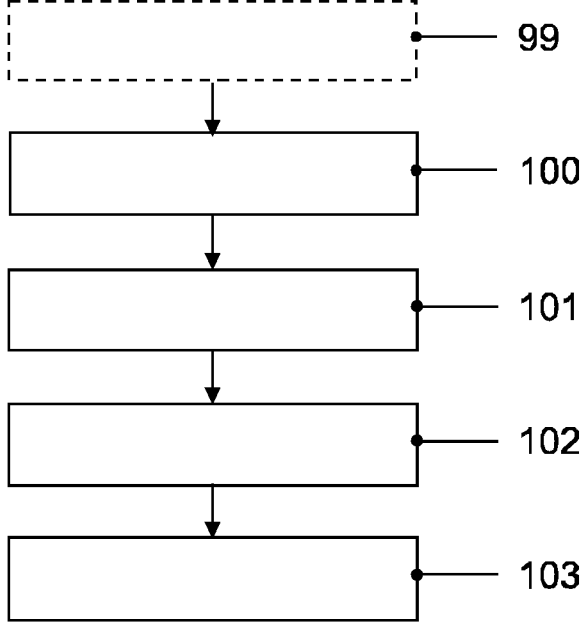
FIG. 6 shows a schematic flowchart of an embodiment of the method.

FIG. 6 shows a schematic flowchart of an embodiment of the method for calibrating cameras of a multichannel medical visualization system. By way of example, the method is carried out by means of a medical visualization system, as described hereinabove with reference to FIG. 1.

In a method step 100, a capturing region respectively imaged via channels of the multichannel medical visualization system is respectively captured by means of a respective camera at the different magnification levels when at least two magnification levels of the common mechanical magnification optical unit are set. The cameras provide a respective image representation at the various magnification levels.

A respective magnification centre is determined for each of the channels in a method step 101. To this end, an image region which does not move or which moves the least across the magnification levels is identified for each of the channels in the captured image representations which were captured by means of the respective camera at the at least two magnification levels when the at least two magnification levels were set.

In a method step 102, proceeding from the respectively determined magnification centres, an image portion for each of the channels is defined in the captured image representations with the respectively identified magnification centre as the centre.

In a method step 103, the captured image representations (in particular also captured image representations captured following the calibration) are cropped at all magnification levels to the defined image portions and the cropped captured image representations are output. The output may comprise display on a display device of the medical visualization system.

In a method step 99, provision can be made for the medical visualization system to be aligned in such a way that the captured image representations are in focus when the determined magnification centres coincide with the same object point.

Further embodiments of the method were already described hereinabove with reference to the medical visualization system.

LIST OF REFERENCE SIGNS

1 Medical visualization system
2 Stereoscopic medical visualization system
3L Channel (left optical path)
3R Channel (right optical path)
4 Objective
5 Common mechanical magnification optical unit
6 Beam splitter unit
7 Binocular tube
8 Eyepiece
9L Camera (left)
9R Camera (right)
10 Control device
10-1 Computing device
10-2 Memory
11L Image sensor (left camera)
11R Image sensor (right camera)
12 Captured image representation 12L Captured image representation (left)
12R Captured image representation (right)
13 Image portion/output
13L Image portion (left)
13R Image portion (right)
14 Display device
15 Magnification centre
15L Magnification centre (left image representation)
15R Magnification centre (right image representation)
16 Picture element
17 Maintenance request
18 Alignment request
19 Actively movable (linear) axis
20 Capturing region
21 Absolute twist
30L Movement direction (left)
30R Movement direction (right)
40 Control signal
51-$x$ Feature
52-$x$ Feature
53-$x$ Feature
54 Intersection
55 Straight line
56 Straight line
57 Straight line
61-$x$ Feature
62-$x$ Feature
63 Displacement direction
64 Coordinate axis (image sensor/image representation)
99-103 Method steps

The invention claimed is:

1. A method for calibrating cameras of a multichannel medical visualization system, the method comprising:
    capturing a capturing region respectively imaged via channels of the multichannel medical visualization system by a respective camera,
    determining a respective magnification center for each of the channels,
    setting at least two magnification levels of a common mechanical magnification optical unit,
    identifying an image region which does not move or which moves the least across the magnification levels for each of the channels in image representations which are captured at each of the at least two magnification levels by the respective camera,
    proceeding from the respectively determined magnification centers, defining an image portion for each of the channels that is in the captured image representations with the respectively identified magnification center as the center, and
    restricting an output of the captured image representations at all magnification levels to the image portion defined for the respective channel.

2. The method according to claim 1, wherein dimensions of the image portions are defined for all directions taking into consideration dimensions of the image representation provided by a respective image sensor of the cameras.

3. The method according to claim 1, wherein the defined image portions are chosen to have the same size.

4. The method according to claim 1, wherein a relative twist of the captured image representations of the channels is also determined with respect to one another,
    wherein at least one feature is identified in the captured image representations and a movement direction of a movement, implemented over the at least two magnification levels, of the at least one identified feature in the captured image representations is determined and evaluated, and
    wherein the determined relative twist is corrected at least for the defined image portions by adapting at least one of the image portions and/or by image processing.

5. The method according to claim 1, wherein an absolute twist is also determined for at least one channel on the basis of captured image representations,
    wherein the at least one channel of the multichannel visualization system is displaced by means of at least one actively movable axis of the visualization system, and
    wherein at least one of the defined image portions is additionally or alternatively corrected by adapting the image portion and/or by image processing taking into consideration the determined absolute twist.

6. The method according to claim 1, wherein a reference calibration object is used when determining the magnification centers and/or the twist(s).

7. The method according to claim 1, wherein the calibration is performed automatically following a start-up and/or before a shutdown of the medical visualization system and/or at given time intervals and/or at given times and/or after a given number of operating cycles.

8. The method according to claim 1, wherein the calibration is carried out during the normal operation of the medical visualization system, if a magnification is changed and at least two magnification levels are set.

9. The method according to claim 1, wherein the magnification centers and/or the twist(s) are determined by an artificial intelligence method and/or by determination of the optical flow.

10. The method according to claim 1, wherein a maintenance request and/or alignment request is generated and output if at least one of the defined image portions is adjacent to or goes beyond an edge of the image representation provided by an image sensor of the respective camera.

11. The method according to claim 1, wherein at least three magnification levels are set,
    wherein magnification centers are determined in each case by in each case taking account of at least two adjacent magnification levels of the at least three magnification levels, and
    wherein a scatter of the determined magnification centers is evaluated.

12. The method according to claim 1, wherein at least three magnification levels are set,
    wherein magnification centers are determined in each case by in each case taking account of at least two adjacent magnification levels of the at least three magnification levels, and
    wherein the image portions of the channels are defined in each case proceeding from a set magnification level and the magnification centers determined therefor in each case if different magnification centers are determined at different magnification levels and/or if a scatter of the determined magnification centers exceeds a given limit value.

13. The method according to claim 1, wherein at least one same feature is recognized in the image portions respectively defined for the channels,
    wherein a respective position of the at least one recognized same feature is determined in the respective image portions of the channels, and
    wherein a deviation between the positions determined for the channels in each case is determined and evaluated.

14. The method according to claim 1, wherein the medical visualization system is in the form of a stereoscopic medical visualization system with at least two channels.

15. A medical visualization system, comprising:

a plurality of channels for capturing and imaging a capturing region, a camera for each of the plurality of channels, configured to capture the respective capturing region imaged by way of the channel, a common mechanical magnification optical unit, and a control device, wherein the control device is configured, for calibration purposes, to determine a respective magnification center for each of the channels and control the common mechanical magnification optical unit in such a way that at least two magnification levels are set, and to identify an image region which does not move or which moves the least across the magnification levels for each of the channels in image representations which are captured at the at least two magnification levels by means of the respective camera, in each case proceeding from the respectively determined magnification centers, to define an image portion for each of the channels in the captured image representations with the respectively identified magnification center as the center, and to restrict an output of the captured image representations at all magnification levels to the image portion defined for the respective channel.

\* \* \* \* \*